US008072656B2

(12) United States Patent
Kubo

(10) Patent No.: US 8,072,656 B2
(45) Date of Patent: Dec. 6, 2011

(54) IMAGE FORMING APPARATUS AND OPTICAL CONTROLLER

(75) Inventor: Isao Kubo, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1015 days.

(21) Appl. No.: 11/946,078

(22) Filed: Nov. 28, 2007

(65) Prior Publication Data

US 2008/0123161 A1     May 29, 2008

(30) Foreign Application Priority Data

Nov. 29, 2006   (JP) ................................. 2006-322193

(51) Int. Cl.
*H04N 1/04* (2006.01)

(52) U.S. Cl. ........ 358/475; 358/509; 358/518; 358/505; 399/301; 351/85; 369/53.27; 382/275

(58) Field of Classification Search .................. 358/474, 358/501, 475, 509, 505, 504, 518, 520, 523, 358/537, 461, 452, 468; 382/254, 275, 274; 351/85, 309; 369/53, 27, 112.16, 47.51
See application file for complete search history.

(56) References Cited

U.S. PATENT DOCUMENTS

| 4,661,692 | A | * | 4/1987 | Kawasaki | 250/201.2 |
|---|---|---|---|---|---|
| 5,365,564 | A | * | 11/1994 | Yashida et al. | 378/55 |
| 5,561,285 | A | * | 10/1996 | Sakata et al. | 250/205 |
| 5,636,233 | A | * | 6/1997 | Sato et al. | 372/31 |
| 6,007,174 | A | * | 12/1999 | Hirabayashi et al. | 347/14 |
| 6,100,908 | A | | 8/2000 | Nishizawa | |
| 6,151,419 | A | * | 11/2000 | Aoki | 382/274 |
| 7,027,194 | B2 | * | 4/2006 | Kanda | 358/496 |
| 7,075,569 | B2 | * | 7/2006 | Niikawa | 348/218.1 |
| 7,173,743 | B2 | * | 2/2007 | Yamazaki | 358/483 |
| 7,190,493 | B2 | * | 3/2007 | Maki et al. | 358/461 |
| 7,397,969 | B2 | * | 7/2008 | Enomoto et al. | 382/275 |
| 7,852,521 | B2 | * | 12/2010 | Aoki | 358/474 |
| 7,859,726 | B2 | * | 12/2010 | Endo et al. | 358/474 |
| 7,945,096 | B2 | * | 5/2011 | Okada | 382/181 |
| 7,952,770 | B2 | * | 5/2011 | Ikeno et al. | 358/461 |
| 2003/0072495 | A1 | * | 4/2003 | Maki et al. | 382/254 |

(Continued)

FOREIGN PATENT DOCUMENTS

JP     11-204890     7/1999

(Continued)

OTHER PUBLICATIONS

Notification of Reasons for Refusal issued in corresponding Japanese Application No. 2006-322193 dated Aug. 23, 2011.

*Primary Examiner* — Negussie Worku
(74) *Attorney, Agent, or Firm* — Banner & Witcoff, Ltd

(57) ABSTRACT

An image forming apparatus is provided. The image forming apparatus includes a light emitter which emits light; a drive section which drives the light emitter according to a control signal; a light amount detection section which detects an amount of light which is emitted from the light emitter; an analog to digital converter which converts the amount of light into a digital value; a feedback controller which controls the control signal based on the digital value and a reference value, and outputs the control signal to the drive section; and a setting change section which sets a change unit used by the feedback controller to control the control signal.

14 Claims, 7 Drawing Sheets

U.S. PATENT DOCUMENTS

| | | | |
|---|---|---|---|
| 2004/0051918 A1* | 3/2004 | Sato et al. | 358/509 |
| 2004/0109614 A1* | 6/2004 | Enomoto et al. | 382/275 |
| 2005/0068590 A1* | 3/2005 | Shiota et al. | 358/474 |
| 2005/0146758 A1* | 7/2005 | Tsuchihashi | 358/506 |
| 2006/0291016 A1* | 12/2006 | Ishigami et al. | 358/518 |
| 2007/0013978 A1* | 1/2007 | Watanabe et al. | 358/504 |
| 2007/0291334 A1* | 12/2007 | Nakanishi | 358/509 |

FOREIGN PATENT DOCUMENTS

| | | |
|---|---|---|
| JP | 2003-069139 | 3/2003 |
| JP | 2004-347844 | 12/2004 |
| JP | 2006-088362 | 4/2006 |

* cited by examiner

IMAGE FORMING APPARATUS AND OPTICAL CONTROLLER

CROSS-REFERENCE TO RELATED APPLICATION

This application claims priority from Japanese Patent Application No. 2006-322193, filed on Nov. 29, 2006, the entire subject matter of which is incorporated herein by reference.

TECHNICAL FIELD

Apparatuses and devices consistent with the present invention relate to formation of an image and, more particularly, to controlling an amount of laser light used in an image forming apparatus.

BACKGROUND

JP-A-2006-88362 discloses a related art technique to perform feedback control, and more specifically, average power control (APC), of laser light emitted from a laser diode.

SUMMARY

However, there are a number of problems associated with the related art feedback control. First, it is difficult to set change units of a controlling variable. For example, when controlling the light amount of laser light from a light emitter by increasing or decreasing the drive current amount, the feedback control is performed with the change unit being a constant value. Generally, as the change units become smaller, the control accuracy increases, but the speed of correction decreases. In contrast, as the change unit becomes larger, the control accuracy decreases although the speed of correction increases. Therefore, it is advantageous that the change unit should be set properly considering the use environment.

Moreover, in an image forming apparatus using a light emitter, a change amount of the light amount, in response to a set amount of change of a light emission strength control signal, varies according to the environment of use and the components used in the image forming apparatus. This may cause a problem. That is, according to variations in the environment and components, the light amount may change by a large or small amount in response to the set amount of change of the light emission strength control signal. Therefore, when the change unit of the controlling variable is set, it is advantageous that such circumstances should be considered.

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an aspect of the present invention to provide an image forming apparatus that can perform appropriate feedback control of a light amount while taking into account variations in the environment of use and the components used in the image forming apparatus.

The above and other aspects of the present invention are accomplished by providing an image forming apparatus which includes a light emitter which emits laser light; a drive section which drives the light emitter according to a control signal; a light amount detection section which detects an amount light which is emitted from the light emitter; an analog to digital (A/D) converter which converts the amount of light into a digital value; a feedback controller which controls the control signal based on the digital value and a reference value, and outputs the control signal to the drive section; and a setting change section which sets a change unit used by the feedback controller to control the control signal.

BRIEF DESCRIPTION OF THE DRAWINGS

The above and other aspects of the present invention will become more apparent and more readily appreciated from the following description of exemplary embodiments of the present invention taken in conjunction with the attached drawings, in which.

DETAILED DESCRIPTION

Embodiment

Exemplary embodiments of the present invention will now be discussed with reference to the accompanying drawings.

Figure 1:
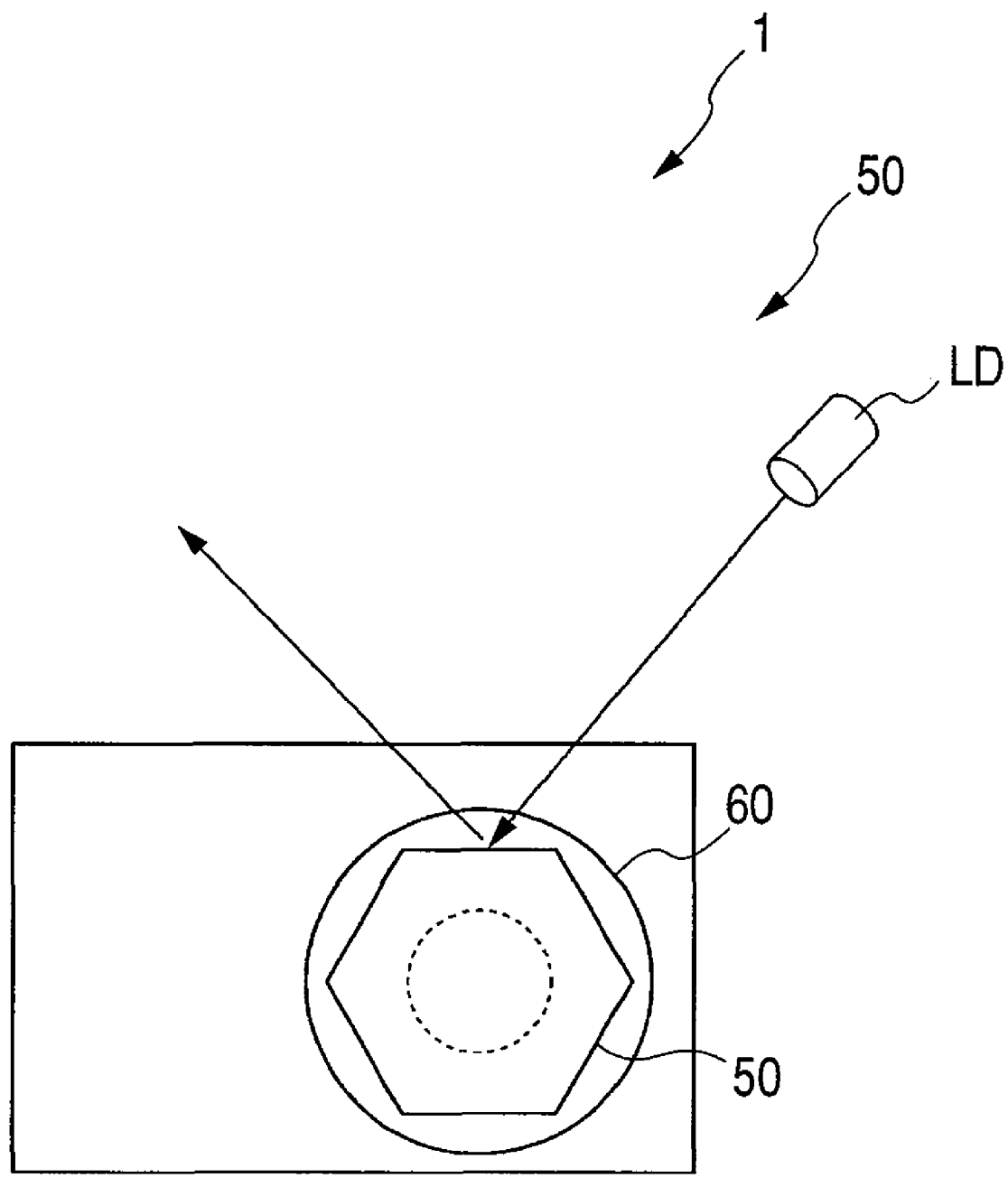
FIG. 1 is a schematic drawing conceptually illustrating how laser light is applied from a laser diode (LD) in an image forming apparatus according to a first exemplary embodiment of the present invention.
Figure 2:
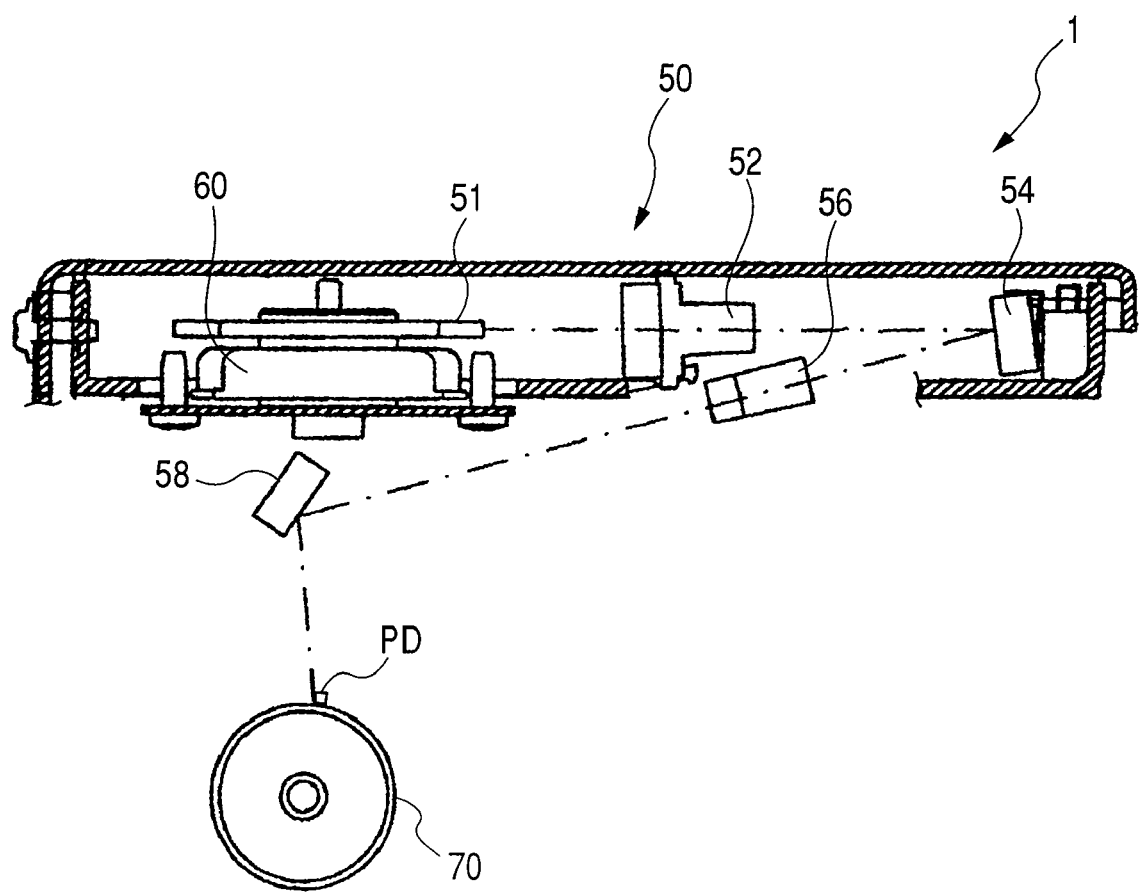
FIG. 2 is a schematic drawing illustrating a route where laser light is applied to a photoconductor according to an exemplary embodiment of the present invention.

Referring to FIGS. 1 and 2, an image forming apparatus 1 according to an exemplary embodiment of the present invention is implemented as a laser printer. FIGS. 1 and 2 show only a part (i.e., a scanner section 50) of the image forming apparatus 1. Although not shown in FIG. 1 or 2, one of ordinary skill in the art will appreciate that the image forming apparatus 1 also may include a sheet feeding section, a process section, a fixing section, etc., in addition to the scanner section 50 and may be implemented as an electrophotographic laser printer.

The scanner section 50 is provided in a main section casing and includes a laser diode LD (a light emitter or a semiconductor laser), a polygon mirror 51 rotated by a scanner motor 60, lenses 52 and 56, reflecting mirrors 54 and 58, etc., as shown in FIGS. 1 and 2. Laser light, based on image data, emitted from the diode LD is led to pass through or to be reflected in the order of the polygon mirror 51, the lens 52, the reflecting mirror 54, the lens 56, and the reflecting mirror 58, and is applied in high-speed scanning onto the surface of a photoconductor drum 70 provided in the process section as indicated by the alternate long and short dash line in FIG. 2.

The polygon mirror 51, the lens 52, the reflecting mirror 54, the lens 56, the reflecting mirror 58, and the like correspond to optical system components.

Figure 3:
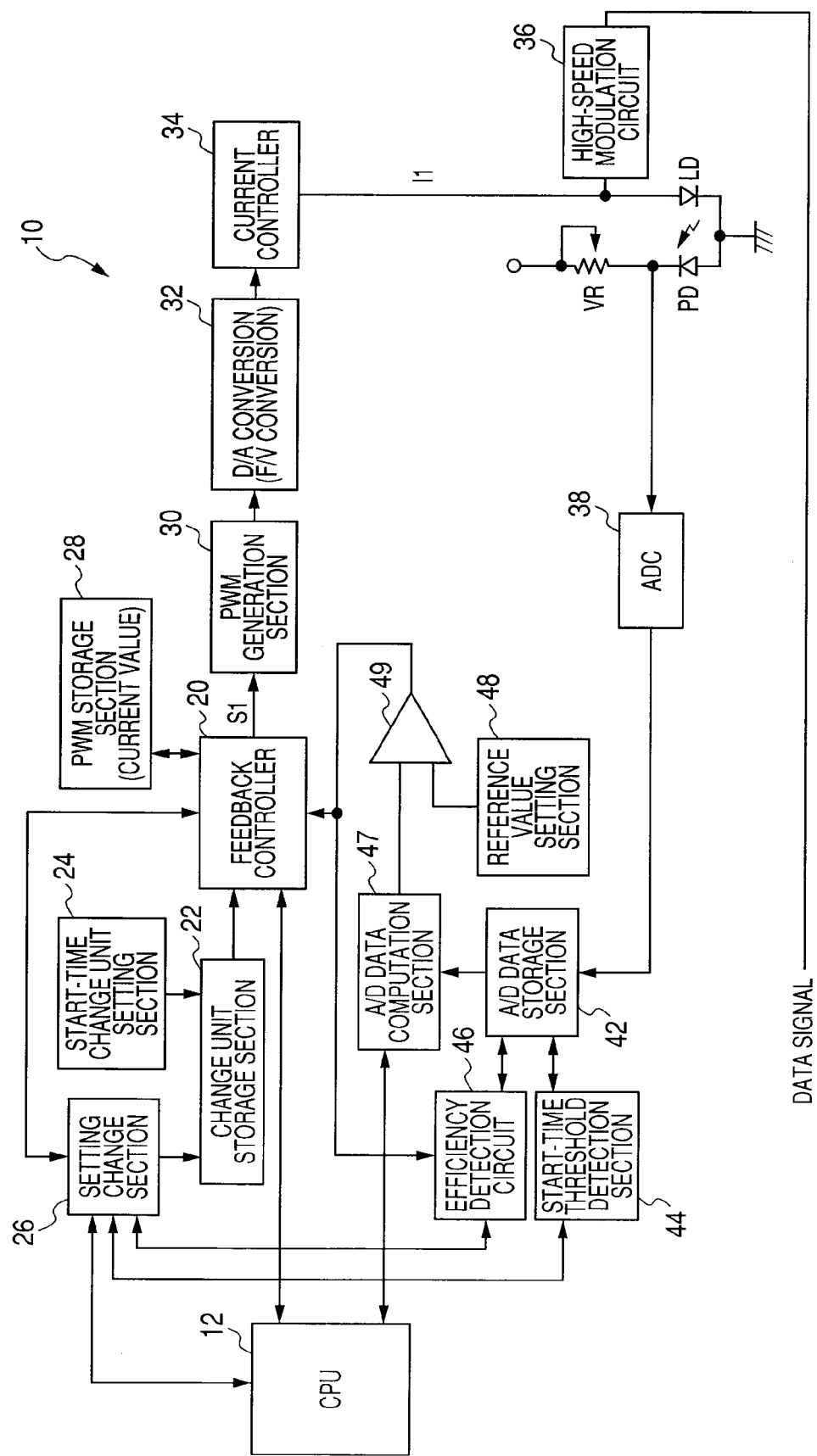
FIG. 3 is a block diagram illustrating the electric configuration of a controller of laser light according to an exemplary embodiment of the present invention.

Next, referring to FIG. 3, a controller 10 of the laser light will be discussed. The controller 10 includes a laser diode LD which emits laser light, a photodiode PD which detects an amount of the laser light from the laser diode LD and outputs the light amount detection result, and a current controller 34 which controls a flow of the drive current into the laser diode LD according to the level of a light emission strength control signal. A CPU 12 which performs various types of processing is connected to a feedback controller 20 and an A/D data computation section 47 (described later).

In the controller 10, the feedback controller 20 generates a light emission strength control signal S1 and this light emission strength control signal S1 corresponds to the level of a current I1 that flows to the laser diode LD. The light emission strength control signal S1 output by the feedback controller 20 is converted into a pulse width modulation (PWM) signal having a corresponding level by a PWM generation section 30, and the PWM signal is converted into a corresponding analog signal by a digital to analog (D/A) converter 32 and the analog signal is output to a current controller 34. As described above, the drive current I1 according to the analog signal flows from the current controller 34 into the laser diode LD. A high-speed modulation circuit 36 is coupled between the current controller 34 and the laser diode LD and performs on and off control of the current supplied to the laser diode LD based on a data signal. In other words, the high-speed modulation circuit 36 controls light emission and no light emission states of the laser diode LD.

The photodiode PD is implemented as a known photodiode and generates a current according to the light reception amount. The current generated according to the light reception amount of the photodiode PD is used as the light amount reception result and is input to an A/D converter 38. The A/D converter 38 converts the light amount reception result input as an analog signal into a digital value and outputs the digital value, and an A/D data storage section 42 stores the digital value so that the digital value is updated. The amount of current generated by the photodiode PD relative to the light reception amount of the photodiode PD is adjustable with a semi-fixed resistor VR. The value stored in the A/D data storage section 42 is used in an A/D data computation section 47, an efficiency detection circuit 46, and a start-time threshold detection section 44.

The A/D data computation section 47 provides the digital value stored in the A/D data storage section 42 (i.e., the digital value according to the light amount reception result) to a comparator 49. The comparator 49 compares the digital value from the A/D converter 38 with a reference value stored in a reference value setting section 48. When the reference value is larger than the digital value, the comparator 49 outputs a positive signal. On the other hand, when the reference value is smaller than the digital value, the comparator 49 outputs a negative signal. The reference value corresponds to the target value of the amount of the laser light at a time of printing (specifically, a target light amount to be detected in the photodiode PD at the time of printing). Accordingly, the digital value from the A/D converter 38 which is obtained when the amount of the laser light becomes the target value is set as the reference value. The output from the comparator 49 is provided to the feedback controller 20 and the efficiency detection circuit 46.

The feedback controller 20 generates the light emission strength control signal S1 based on the digital value from the A/D converter 38 and the reference value and outputs a result to the current controller 34. The light emission strength control signal S1 is changed based on the change unit stored in a change unit storage section 22. Specifically, when the output level from the A/D converter 38 is less than the reference value stored in the reference value setting section 48 (namely, when the light amount is less than the target value), the change unit stored in the change unit storage section 22 is added to the previous light emission strength control signal S1 and the obtained light emission strength control signal S1 is output. On the other hand, when the output level from the A/D converter 38 is larger than the reference value stored in the reference value setting section 48, the change unit stored in the change unit storage section 22 is subtracted from the previous light emission strength S1, and the obtained light emission strength control signal S1 is output.

The light emission strength control signal S1 indicates the pulse width of the PWM signal generated by the PWM generation section 30, and the addition or subtraction of the "change unit" serves to increase or decrease the pulse width. That is, when a positive signal is output from the comparator 49, the light emission strength control signal S1 which is for increasing the pulse width by an amount corresponding to the change unit stored in the change unit storage section 22 is output. On the other hand, when a negative signal is output from the comparator 49, the light emission strength control signal S1 which is for decreasing the pulse width by the amount corresponding to the change unit stored in the change unit storage section 22 is output.

A setting change section 26 sets the change unit applied when the feedback controller 20 changes the light emission strength control signal S1 according to the light emission efficiency of the laser diode LD. Specifically, the setting change section 26 changes the "change unit" stored in the change unit storage section 22 according to the light emission efficiency.

The expression "light emission efficiency" mentioned herein denotes a degree of change of the light amount in response to the level change of the light emission strength control signal S1. Specifically, the degree of change of the light amount in the irradiated object (photoconductor drum) with laser light in response to the pulse width change caused by the light emission strength control signal S1 is detected as the light emission efficiency. In this exemplary embodiment, the "light emission efficiency" corresponds to the degree of change of the light amount on the surface of the photoconductor drum in response to the amount of change of the drive current. That is, the characteristic of the light emission efficiency contains the characteristic of the laser diode LD and the characteristics of the optical system components. In this exemplary embodiment, the light amount of the laser diode LD on the surface of the photoconductor drum 70 (FIG. 2) is measured when the image forming apparatus 1 is assembled, the value of the semi-fixed resistor VR is adjusted so that output of the photodiode PD at the time of a light emission amount becomes a certain value, and the controller 10 is initialized in a factory.

The controller 10 according to this exemplary embodiment includes the efficiency detection circuit 46 which detects the light emission efficiency of the laser diode LD considering the optical system components, and the setting change section 26 mentioned above sets the change unit stored in the change unit storage section 22 based on the light emission efficiency detected by the efficiency detection circuit 46.

The efficiency detection circuit 46 calculates the light emission efficiency based on a level of the light emission strength control signal when the light amount of the laser diode LD becomes a first value P1 and a level of the light emission strength control signal when the light amount of the laser diode LD becomes a second value P2. Specifically, the first value P1 is a threshold value of the laser diode LD (light amount of a boundary where the light amount of the laser diode LD abruptly rises) and the second value P2 is a target value at the printing time.

Figure 6:
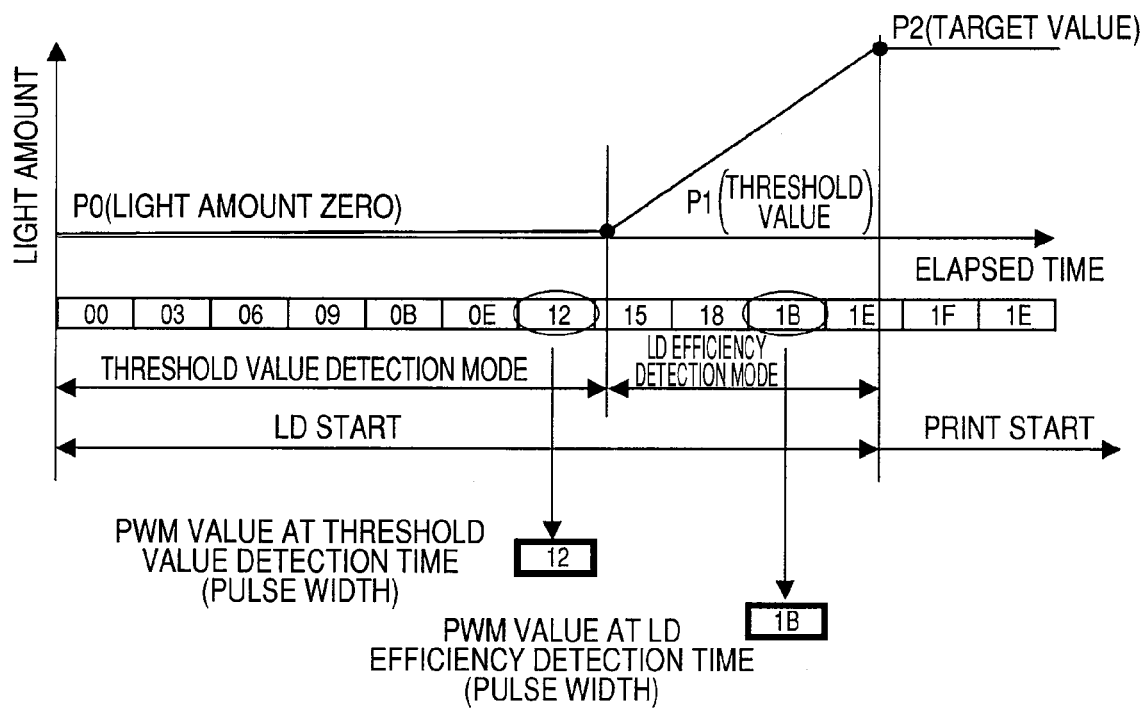
FIG. 6 is a graph illustrating the relationship among a light emission strength control signal, light amount, and elapsed time according to an exemplary embodiment of the present invention.

Specifically, in a detection mode (described later), the feedback controller 20 controls the level of the light emission strength control signal S1 and raises the level gradually by a predetermined level (in this exemplary embodiment, by a start-time change unit) at predetermined intervals from a predetermined low level (in this exemplary embodiment, from a zero level corresponding to light amount zero) as shown in FIG. 6.

At the time of this raise control (i.e., control during detection mode), the efficiency detection circuit 46 detects the elapsed time until the light amount of the laser diode LD reaches the target value (second value P2 (FIG. 6)) since it reached the threshold value (first value P1 (FIG. 6)), and handles the elapsed time as that corresponding to the light emission efficiency. Specifically, since the level of the light emission strength control signal S1 is raised a predetermined level at predetermined intervals, if the pulse width in the threshold value and the pulse width in the target value are found, the elapsed time can be calculated. For example, FIG. 6 shows an example wherein the level is raised by pulse width of "03" (hexadecimal notation) at every time interval t. If the pulse width when the threshold value is reached ("12" (hexadecimal notation) in this example) and the pulse width when the target value is reached ("1B" (hexadecimal notation)) are found, the elapsed time from P1 to P2 is found. The elapsed time becomes shorter if the light emission efficiency is greater; the elapsed time becomes longer if the light emission efficiency is less. Thus, in this exemplary embodiment, the elapsed time is assumed to be that corresponding to the light emission efficiency and the change unit is changed according to the light emission efficiency.

The setting change section 26 changes the change unit stored in the change unit storage section 22 based on the elapsed time detected by the efficiency detection circuit 46. A specific processing flow will be discussed below with reference to FIG. 4.

Figure 4:
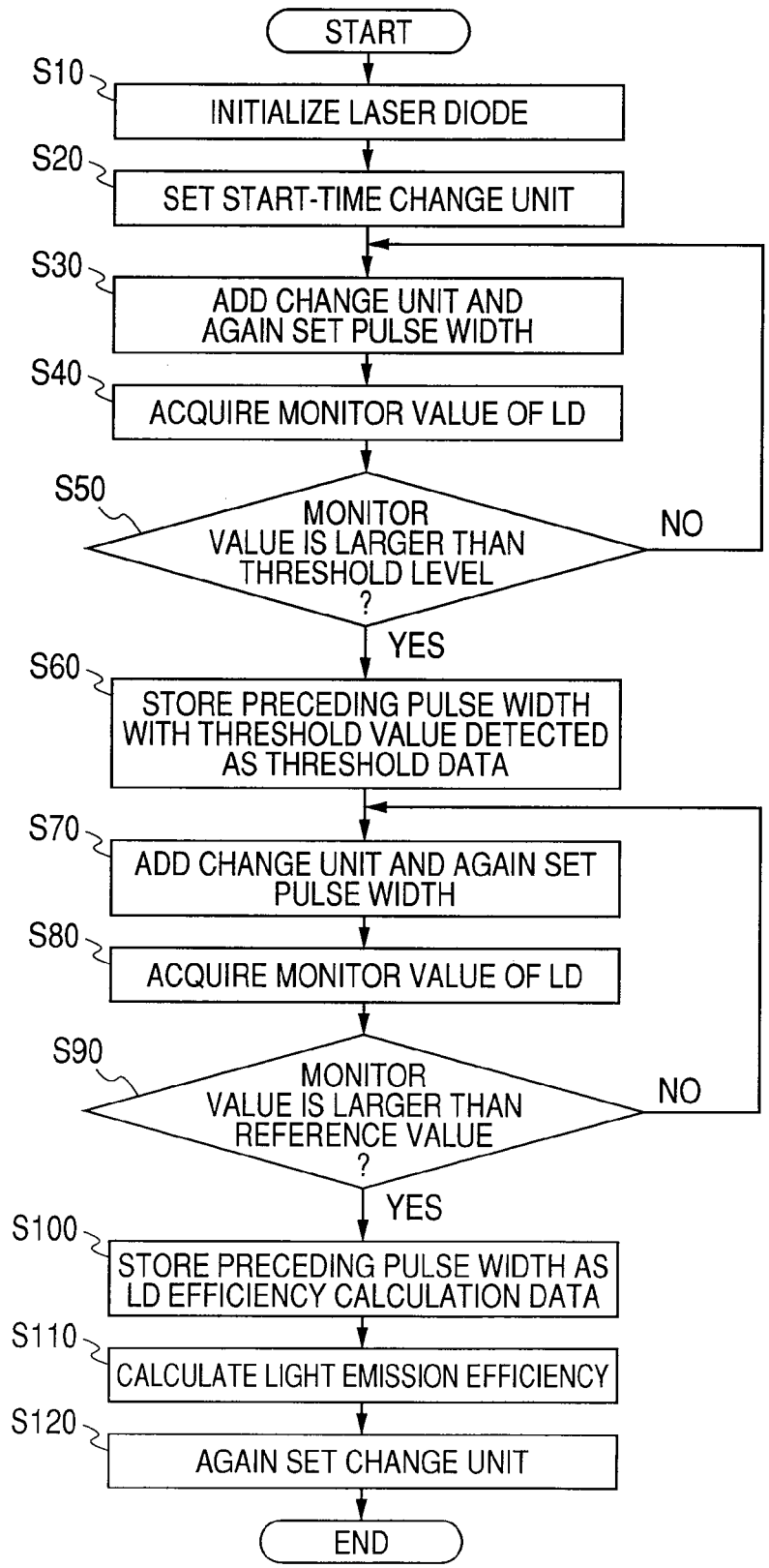
FIG. 4 is a flowchart illustrating setting processing of change units according to an exemplary embodiment of the present invention.

The change unit setting processing can be performed when the image forming apparatus 1 is powered on, starts printing, or is printing (for example, between sheets, etc.). Turning now to FIG. 4, a case where the change unit setting processing is performed when the image forming apparatus 1 starts printing is discussed by way of an example. Operations S10 to S120 correspond to the detection mode and the CPU 12 corresponds to a switch section which switches between the detection mode for detecting the light emission efficiency and any other mode. That is, the CPU 12 sets the image forming apparatus 1 to the detection mode at the start of printing for causing the image forming apparatus 1 to execute operations S10 to S120 and again switches the image forming apparatus 1 to a mode other than the detection mode (for example, a print mode in this exemplary embodiment) after the execution of operation S120.

The setting processing is executed by the CPU 12 in response to the start of printing. First, at operation S10, the laser diode LD is set to an initial state. For example, in this embodiment, the state in which no current is provided to the laser diode LD is the initial state. Next, at operation S20, the change unit (change amount of pulse width) is set to a fixed value. Specifically, the fixed value is preset in a start-time change unit setting section 24, and at operation S20, the change unit at the start of printing is provided from the start-time change unit setting section 24 to the change unit storage section 22 and is set as the change unit in the detection mode. The change unit at the starting time is set to a small level (for example, as small a level of the change units as possible).

Next, at operation S30, the change unit is added to the current light emission strength control signal S1 and the pulse width (PWM value) is again set. In the initial state just after the start, the pulse width is a zero level and therefore is increased by an amount corresponding to the change unit. Then, at operation S40, the monitor value of the light amount of the laser diode LD is acquired. Specifically, the digital value output from the efficiency detection circuit 46 is provided to the CPU 12 by the A/D data computation section 47 and is used as the monitor value.

At operation S50, it is determined whether the digital value exceeds a threshold level. That is, whether or not the light amount of laser light exceeds the threshold value (P1 (see FIG. 6)) is determined. If it is determined that the monitor value (i.e., the digital value output from the efficiency detection circuit 46) does not exceed the threshold level (i.e., when the light amount of laser light does not exceed the threshold value) at operation S50, the determination result at S50 is NO and the process returns to operation S30 and the later operations are repeated. If it is determined that the monitor value exceeds the threshold level at operation S50, the determination result at S50 is YES, and the preceding pulse width of the pulse width when the threshold value is detected is stored as the threshold data at operation S60. The threshold data corresponds to the threshold current provided to the laser diode LD when the light amount of laser light detected in the PD reaches the threshold value.

Further, the pulse width is increased by the amount corresponding to the change unit at operation S70. Then, the monitor value of the light amount of the laser diode LD is acquired at operation S80. Specifically, the digital value output from the efficiency detection circuit 46 is provided to the CPU 12 by the A/D data computation section 47. It is determined whether the monitor value exceeds the reference value is determined at operation S90. The reference value corresponds to the digital value output from the efficiency detection circuit 46 when the light amount of laser light becomes the target value at the time of printing. In other words, it is determined whether the amount of light exceeds the target value at the time of printing. If it is determined that the monitor value (the digital value output from the efficiency detection circuit 46) does not exceed the reference value (i.e., when the light amount of laser light does not exceed the target value at the printing time) at operation S90, the determination result at S90 is NO and the process returns to operation S70. If it is determined that the monitor value exceeds the reference value (i.e., when the amount of laser light exceeds the target value at the time of printing) at operation S90, the determination result at S90 is YES, and a preceding pulse width to the pulse width at a time when an excess of the reference value is detected is stored as efficiency calculation data in operation S100, and the light emission efficiency (elapsed time in FIG. 6) is calculated at operation S110.

At operation S120, the change unit is again set based on the calculated light emission efficiency. For example, when the light emission efficiency is equal to or greater than a threshold level, the change unit may be set to a first change unit. When the light emission efficiency is less than the threshold level, the change unit may be set to a second change unit. The value of the change unit may also be able to be changed to any of three or more levels. For example, when the light emission efficiency is in a first range, the change unit may be set to a first change unit; when the light emission efficiency is in a second range, the change unit may be set to a second change unit; when the light emission efficiency is in a third range, the change unit may be set to a third change unit, and so on.

Figure 5:
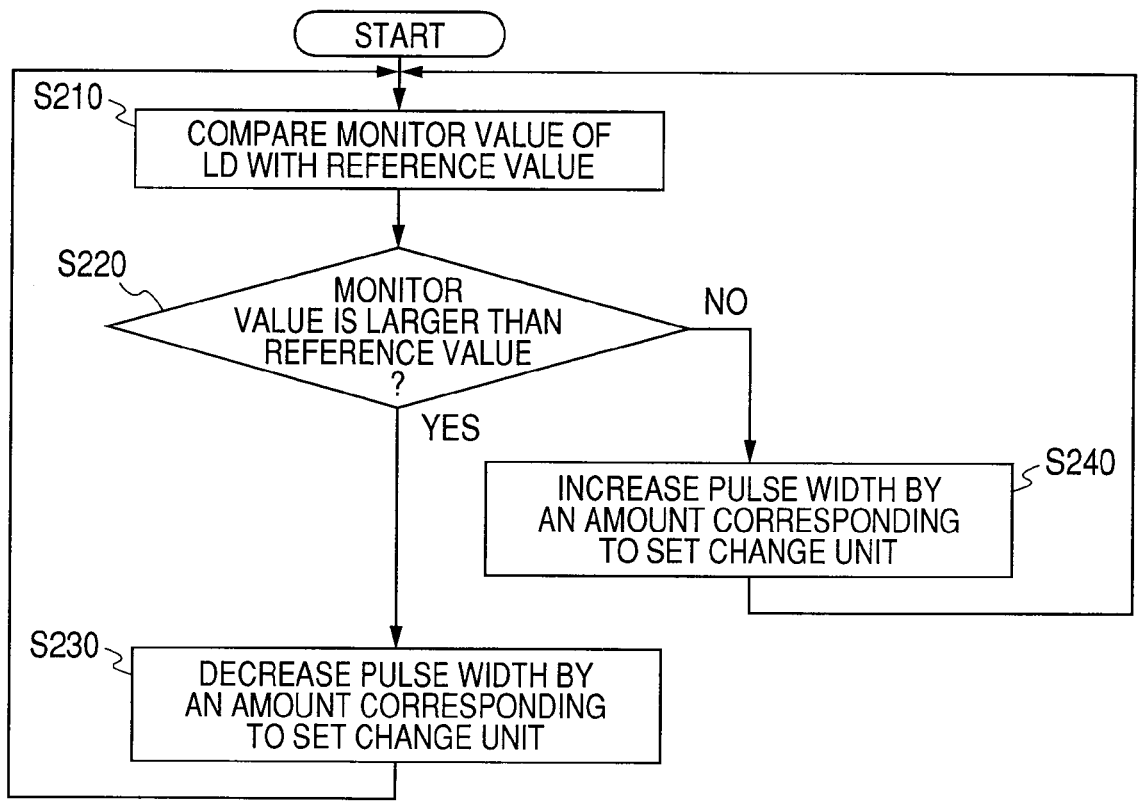
FIG. 5 is a flowchart illustrating control processing of laser light according to an exemplary embodiment of the present invention.

FIG. 5 illustrates control processing of laser light in a case where the processing is executed during printing. In the processing, a comparison is made between the monitor value of the laser diode LD (i.e., the current digital value from the A/D converter 38) and the reference value (i.e., the level corresponding to the target value of light amount) at operation S210. It is then determined if the monitor value is larger than the reference value at operation S220. If it is determined that the monitor value is larger than the reference value, the determination result at S220 is YES and the pulse width is decreased by an amount corresponding to the set change unit at operation S230 If it is determined that the monitor value is smaller than the reference value, the determination result at S220 is NO and the pulse width is increased by an amount corresponding to the set change unit at operation S240.

As described above, according to this exemplary embodiment, the setting change section 26 which changes setting according to the light emission efficiency of the laser diode LD is provided. Therefore, it may be possible to change the change unit in feedback control according to the light emission efficiency of the laser diode LD and appropriate feedback control according to the light emission efficiency may be obtained.

According to the configuration of this exemplary embodiment, the efficiency detection circuit 46 which detects the light emission efficiency of the laser diode LD and the change unit storage section 22 which stores the change unit are provided, the feedback control section 20 changes the light emission strength control signal based on the change unit stored in the change unit storage section 22, and the setting change section 26 changes setting of the change unit stored in the change unit storage section 22 based on the light emission efficiency detected by the efficiency detection circuit 46. According to the configuration, the setting of the change unit may be automatically changed according to the use environment.

In this exemplary embodiment, the efficiency detection circuit 46 calculates the light emission efficiency based on a first level of the light emission strength control signal when the light amount of the laser diode LD becomes the first value and a second level of the light emission strength control signal when the light amount of the laser diode LD becomes the second value. According to the configuration, how much the light amount will change in response to the level change of the light emission strength control signal may be easily determined with high accuracy.

In this exemplary embodiment, the laser diode LD is a semiconductor laser, the first value is the threshold value of the laser diode LD, and the second value is the target value at the time of printing. According to the configuration, it may be possible to detect the light emission efficiency more appropriately in the range of the threshold value to the target value having a large effect on performing feedback control.

In this exemplary embodiment, the image forming apparatus 1 is switched between the detection mode for detecting the light emission efficiency and a mode other than the detection mode. In the detection mode, the feedback control section 20 raises the level of the light emission strength control signal gradually by a predetermined level at a predetermined interval from a predetermined low level, and the efficiency detection circuit 46 is configured so as to detect the time interval from when the light amount of the laser diode LD reaches the first value to a time when the light amount of the laser diode LD reaches to the second value in the raise control. Further, the setting change section 26 is configured so as to change the change unit based on the time period. According to the configuration, the light emission efficiency may be detected rapidly and appropriately.

Other Embodiments

The invention is not limited to the specific embodiment described above with reference to the accompanying drawings and, for example, the following embodiments are also contained in the technical scope of the invention.

For example, the setting change section 26 may be configured so as to change the change unit based on the differential efficiency of the laser diode LD. When the change unit in feedback control is thus changed according to the differential efficiency, preferred feedback control appropriately reflecting the light emission efficiency of the laser diode LD may be provided.

Figure 7:
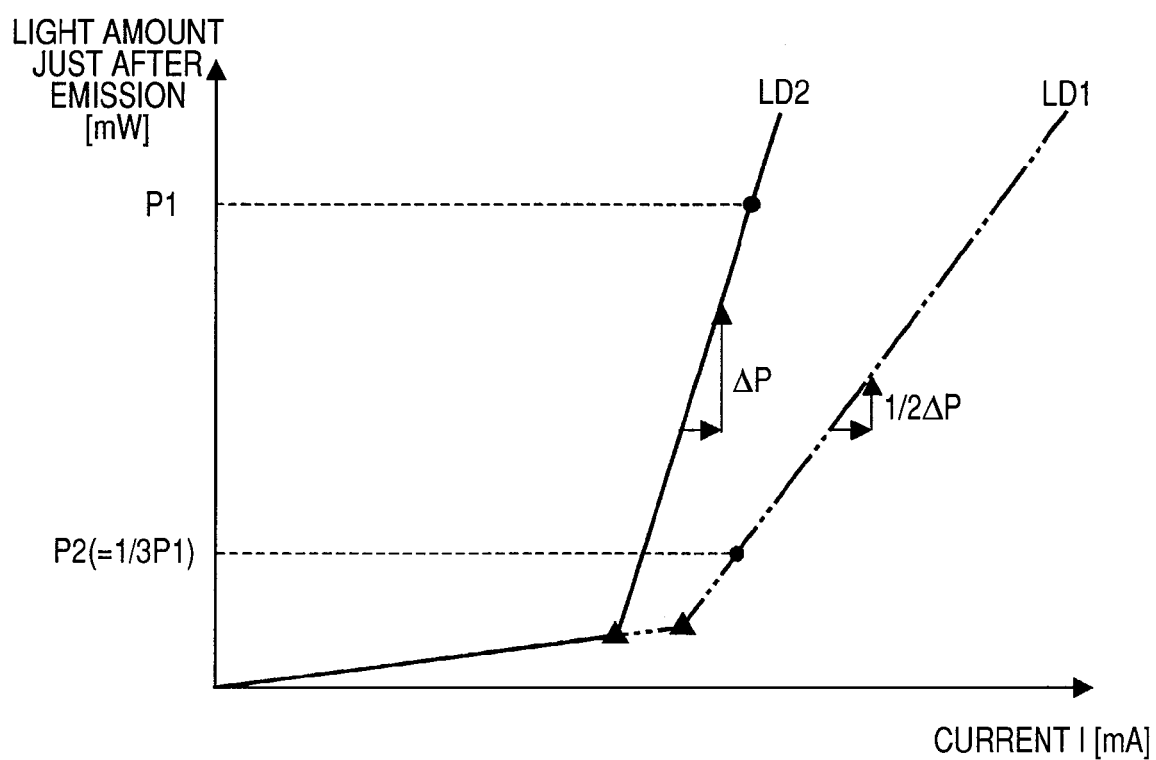
FIG. 7 is a graph illustrating light emission efficiency according to an exemplary embodiment of the present invention.

The differential efficiency denotes a degree of output change of the light emitter per a unit of current and can be calculated by detecting laser light just the laser light is emitted from the laser diode LD as shown in FIG. 7. As shown in FIG. 7, the differential efficiency of a first laser diode LD1 is ½ΔP and the differential efficiency of a second laser diode LD2 is ΔP. In this case, setting of the change unit may be changed according to the differential efficiency. For example, if it is determined that the differential efficiency is a threshold level or more, the change unit may be set to a first change unit. If it is determined that the differential efficiency is less than the threshold level, the change unit may be set to a second change unit.

The setting change section 26 may also be configured so as to change the change unit based on a light use efficiency of the laser diode LD. The light use efficiency denotes a ratio of the power of the laser light applied to the irradiated object (for example, photoconductor) to the power of the laser light emitted from the light emitter (for example, laser diode). The light use efficiency is affected by attenuation in components of an optical system such as lenses or a polygon mirror, and leakage due to an extent of a radiation angle of the light emitter. That is, when the light use efficiency is larger, energy lost by leakage or attenuation while the laser light is emitted from the light emitter and applied to the object is smaller. When the light use efficiency is smaller, energy lost by leakage or attenuation while the laser light is emitted from the light emitter and applied to the object is larger. When the change unit in feedback control is thus changed according to the light use efficiency, preferred feedback control appropriately reflecting the light emission efficiency of the laser diode LD may be provided.

The light use efficiency can be determined based on a drive current (i.e., a second current) provided to the light emitter when the laser light reaches the threshold value, and the drive current (i.e., a first current) provided to the light emitter when the laser light reaches to the target value. For example, the difference between the first current and the second current may be assumed to be the light use efficiency and the value resulting from multiplying the difference between the first current and the second current by the differential efficiency may be assumed to be the light use efficiency. Setting of the change unit may be changed according to this light use efficiency. For example, if it is determined that the light use efficiency is a threshold level or more, the change unit may be set to a first change unit. If it is determined that the light use efficiency is less than the threshold level, the change unit may be set to a second change unit.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. An image forming apparatus comprising:
    a light emitter configured to emit light;
    a light amount detector which detects an amount of light which is emitted from the light emitter;
    a processor; and
    memory storing computer-executable instructions that, when executed by the processor, perform operations including
        generating a control signal by changing a previous control signal by a unit of change based on the detected amount of light;
        varying a flow of current to the light emitter according to the control signal; and
        varying the change unit to change the control signal, based on a relationship between the current flowing into the light emitter and the amount of light detected.

2. The image forming apparatus according to claim 1, wherein the memory storing computer-executable instructions that, when executed by the processor, further perform operations including setting the change unit according to a light emission efficiency of the light emitter.

3. The image apparatus according to claim 2, wherein the light emission efficiency comprises a differential efficiency of the light emitter.

4. The image apparatus according to claim 2, wherein the light emission efficiency comprises a light use efficiency of the light emitter.

5. The image apparatus according to claim 1, wherein the memory storing computer-executable instructions that, when executed by the processor, further perform operations including:
    detecting a light emission efficiency of the light emitter;
    storing the change unit in a change unit storing section;
    controlling the control signal based on the change unit stored in the change unit storage section; and
    setting the change unit stored in the change unit storage section based on the light emission efficiency detected.

6. The image apparatus according to claim 5, wherein the detecting of the light efficiency includes calculating the light emission efficiency based on a first level of the control signal when the detected amount of light becomes a first value, and a second level of the control signal when the detected amount of light becomes a second value.

7. The image apparatus according to claim 6,
    wherein the light emitter comprises a semiconductor laser,
    wherein the first value is threshold value of the semiconductor laser, and
    wherein the second value is a target value at a time of printing.

8. The image apparatus according to claim 6, wherein the memory storing computer-executable instructions that, when executed by the processor, further perform operations including
    switching among a plurality of modes of the image apparatus, the plurality of modes comprising a detection mode,
    wherein, in the detection mode, the varying of the change unit raises a level of the control signal by a constant amount at a predetermined interval from a predetermined low level,
    wherein the detecting of the light emission efficiency includes detecting a time period comprising a difference between a time when the detected amount of light reaches the first value and a time when the detected amount of light reaches the second value, and
    wherein the setting of the change unit changes the change unit based on the detected time period.

9. An optical controller comprising:
    a processing unit;
    memory storing computer executable instructions that, when executed by the processing unit, cause the controller to operate as
    a detection section which detects an amount of light from a laser diode;
    a control signal calculation section which generates a control signal by changing a previous control signal by a change unit based on the detected amount of light;
    a drive section configured to vary a flow of current to the laser diode according to the control signal from the control signal calculation section; and
    a change unit controller configured to vary the change unit used by the control signal calculation section to change the control signal, based on a relationship between the current flowing into the laser diode and the amount of light detected by the detection section.

10. The optical controller according to claim 9, wherein the memory storing computer-executable instructions that, when executed by the processor, further cause the controller to operate as an efficiency calculator which calculates a light emission efficiency based on the detected amount of light,
    wherein the change unit controller controls the change unit based on the light emission efficiency.

11. The optical controller according to claim 10, wherein the light emission efficiency indicates how much the amount of light of the laser diode changes as the control signal is changed by a value.

12. The optical controller according to claim 11, wherein the change unit controller increases the change unit as the light emission efficiency decreases.

13. A method for controlling a light emitter, comprising:
    detecting an amount of light from the light emitter;
    generating a control signal by changing a previous control signal by a change unit based on the detected amount of light;
    varying a flow of current to the light emitter according to the control signal; and
    varying the change unit to change the control signal, based on a relationship between the current flowing into the light emitter and the amount of light detected.

14. The method according to claim 13, further comprising calculating a light emission efficiency based on the detected amount of light,
    wherein the controlling controls the change unit based on the calculated light emission efficiency.

* * * * *